United States Patent
Coulmeau et al.

(10) Patent No.: US 9,607,521 B2
(45) Date of Patent: Mar. 28, 2017

(54) METHOD FOR THE REAL TIME CALCULATION OF A PLANNED TRAJECTORY, NOTABLY OF A FLIGHT PLAN, COMBINING A MISSION, AND SYSTEM FOR MANAGING SUCH A TRAJECTORY

(71) Applicant: THALES, Courbevoie (FR)

(72) Inventors: François Coulmeau, Toulouse (FR); Laurent Deweerdt, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/852,316

(22) Filed: Sep. 11, 2015

(65) Prior Publication Data
US 2016/0078769 A1    Mar. 17, 2016

(30) Foreign Application Priority Data

Sep. 15, 2014  (FR) ..................... 14 02042

(51) Int. Cl.
*G01C 21/00*  (2006.01)
*G08G 5/00*  (2006.01)
(Continued)

(52) U.S. Cl.
CPC .......... *G08G 5/0034* (2013.01); *G01C 21/20* (2013.01); *G01C 23/00* (2013.01); *G08G 5/003* (2013.01);
(Continued)

(58) Field of Classification Search
CPC ...... G08G 5/0039; G01C 21/00; G01C 21/20; G05D 1/101; G05B 19/19
(Continued)

(56) References Cited

U.S. PATENT DOCUMENTS 8,150,623 B2 *  4/2012  Bitar ............... G05D 1/101
                                               701/16
8,467,915 B1    6/2013  Pangilinan et al.
(Continued)

FOREIGN PATENT DOCUMENTS

EP  2 608 187 A1  6/2013
FR  2 459 963 A1  1/1981
FR  2 984 538 A1  6/2013

*Primary Examiner* — Gertrude Arthur Jeanglaud
(74) *Attorney, Agent, or Firm* — Baker Hostetler LLP

(57) ABSTRACT

The trajectory coming from a planned trajectory, managed by a system, and from at least one trajectory section sent by a third party system to the system, the method at least comprises: a preliminary step in which a knowledge base is produced comprising the calculation parameters and their field of use for the moving object, several envelopes of parameters being defined within the field of use corresponding to different operational constraints of the moving object; a first step in which the system initializes the planned trajectory according to the parameters of the preliminary step, the calculation parameters of the planned trajectory being contained in one of the envelopes; a second step in which the system receives a trajectory section sent by the third party system in order to be inserted in the planned trajectory by replacing a part of the trajectory; a third step in which the received and accepted section is simplified by segmentation in such a way that its calculation parameters are contained in the at least one of the envelopes; the system carrying out calculations on the basis of the simplified trajectory.

19 Claims, 13 Drawing Sheets

(51) Int. Cl.
  *G01C 23/00* (2006.01)
  *G01C 21/20* (2006.01)
(52) U.S. Cl.
  CPC ......... *G08G 5/0021* (2013.01); *G08G 5/0039* (2013.01)
(58) Field of Classification Search
  USPC .............. 701/3, 16, 120, 301, 537; 318/580
  See application file for complete search history.

(56) References Cited

U.S. PATENT DOCUMENTS

| | | | |
|---|---|---|---|
| 9,329,045 B2 * | 5/2016 | Coulmeau | ............. G01C 21/00 |
| 2008/0059058 A1 | 3/2008 | Caillaud et al. | |
| 2009/0234519 A1 | 9/2009 | Hoofd et al. | |
| 2012/0253562 A1 | 10/2012 | Wachenheim et al. | |

* cited by examiner

METHOD FOR THE REAL TIME CALCULATION OF A PLANNED TRAJECTORY, NOTABLY OF A FLIGHT PLAN, COMBINING A MISSION, AND SYSTEM FOR MANAGING SUCH A TRAJECTORY

CROSS-REFERENCE TO RELATED APPLICATION

This application claims priority to foreign French patent application No. FR 1402042, filed on Sep. 15, 2014, the disclosure of which is incorporated by reference in its entirety.

FIELD OF THE INVENTION

The present invention relates to a method for the real time calculation of a planned trajectory, notably of a fight plan, combining a mission. It also relates to a system for managing such a trajectory.

The field of the invention is notably that of the interaction between at least two digital trajectory computation cores. The invention is notably applicable in the field of real time onboard avionic systems, in particular for a flight management system (FMS).

BACKGROUND

With regard to aircraft systems, the invention is applicable notably to real time systems installed in an aircraft, also called avionic systems. The invention is thus applicable to flight management systems (FMS standing for "Flight Management System"), the repository of the "flight plan" for flights in non-segregated airspace.

Systems dedicated to flight plans, such as FMS systems, use as input the concept of "legs" according to the standardized terminology in the aeronautical field and contained in the AEEC ARINC424 international standard. The purpose of this international standard is to regulate the coding of the procedures issued by states, such as for example the departure or arrival procedures.

Legs are constituted by a termination (called termination legs in the ARINC standard) and a type characterizing the way of arriving at the termination (called Path in the ARINC standard). Terminations can be fixed, that is to say determined by their geographic coordinates on the terrestrial globe, the term "waypoints" or passing points then being used. They can also be floating, for example they can correspond to reaching an altitude or an interception with another leg. The paths can be of the orthodromic or loxodromic type. They can also characterize an arrival according to a fixed direction (heading), an arrival according to a fixed route (course), an arc of circle, or they can characterize a turn procedure. The ARINC 424 standard lists 23 types of legs. It also defines the possible combinations between legs, in pairs. In order to regulate the coding of the procedures, and to guarantee flyability according to international civil navigation criteria, the ARINC in fact only authorizes a limited set of combinations.

A flight plan is a succession of legs, that is to say a list of discrete elements. On the basis of this list, FMS systems construct a five-dimension trajectory, called a 5D trajectory, composed of a lateral trajectory and a vertical trajectory.

The lateral trajectory is the continuous "thread" which connects the legs of the flight plan to each other, whilst complying with:

the constraints of the "path" of each of the legs, defined by the ARINC424;
the certified envelope for the aircraft: limitations of the engine parameters, roll angles, etc.
the aircraft comfort: limitations of heading changes, of the roll speed, of engine thrust changes, etc.

The vertical trajectory represents the variation in altitude, speed, passing time and fuel over the course of time. It must comply with:

the vertical constraints (altitude, speed and time constraints);
the certified vertical flight envelope of the aircraft: flight ceiling altitude, maximum values of pitch, incidence, speeds, etc.
the aircraft comfort: limitations of incidences used, changes of speed, altitude variations.

The 5D trajectory resulting from the fusion of the lateral and vertical trajectories is complex to achieve because the two trajectories are strongly coupled:

The lateral trajectory needs data of the vertical trajectory in order to be constructed, in particular the lateral turn radiuses are a function of the aforesaid altitude and speed which will determine a maximum roll angle complying with a limit load factor. Some terminations of legs of the ARINC424 are in "altitude", the leg terminating at the place where a target altitude is reached, the calculation of reaching the altitude resulting from the calculation of the vertical trajectory.

The vertical trajectory needs data of the lateral trajectory, in fact the length of the thread between two points which affects the altitude reached at the second point, starts and ends of turns and associated roll, affecting the lift of the aircraft, etc. . . .

The computers generally carry out iterations between the two trajectories until there is convergence. The calculations are complex and costly in computing time.

Third party trajectory systems do not operate on flight plan data but directly on data of the trajectory. Taking account of their nature:

The surveillance systems (terrain, traffic, meteorological) calculate a lateral or vertical or 5D trajectory by definition; there is in fact no reason for them to depend on the linking of airspace legs, the elements to be avoided having any geometry and location whatsoever. These systems do not include an ARINC 424 navigation database;

The relative navigation systems calculate a trajectory in order to be locked onto a target (aircraft in general); they determine, for example, a vertical trajectory for changing from a given altitude to a target altitude, whilst remaining separated by a limit distance from the aircraft which precede them and whose altitude they intersect;

Mission or advanced guidance systems carry out patterns of trajectories, also called "patterns", of missions having their own geometry, almost systematically different from the possibilities offered by ARINC424. The "patterns" for following buoys at sea, for refueling, snail or spiral, ladder or flower search patterns and drop patterns are trajectories that have nothing to do with ARINC424. Moreover they have the characteristic of not being geometrically fixed in time but are evolutive, in fact the "pattern" of a refueled aircraft must follow the refueling aircraft, the drop point of a drop "pattern" evolves with the wind, the load having to fall onto the same place in the ground, the SAR search pattern evolves in real time with what is detected by the sensors, interception patterns of fighters in the context of airborne police for example. These trajectories are said to be dynamic.

As the third party systems evolve in the different contexts of civil, commercial or other flights, the required capabilities of the aircraft (constraints, envelopes, comfort) are different and these systems therefore produce trajectories according to different computation modes.

One problem whose solution is sought is that of reconciling the systems dedicated to the flight plans and the third party trajectory systems in order to give those operating them (crews, ground operators) a consistent overall view of a mission composed of sections of trajectories coming from several computers. In particular, it is sought to:

make it possible to calculate passing time and fuel predictions over the whole of the flight;

avoid the tedious operations of manually connecting the sections of trajectory from the different computers by the pilot, by an automatic and optimized connection of the sections;

have the capability of processing any type of section notably relative to the flight plans, 2D trajectories, 2D+V trajectories, 3D trajectories, 3D+V trajectories, trajectories with or without transitions, within the same method;

decoupling tactical problems (notably display for the pilot, sending the trajectory to the control systems of the automatic pilot type) from strategic problems (notably calculations of time and fuel predictions);

have the capability to transcribe the various sections of trajectory of one system by that of another system, in particular to have the capability of substituting, in the flight plan of the flight plan dedicated system, a section coming from a third party system, for example a meteorological surveillance system, which replaces the current flight plan by a meteorological avoidance trajectory and which after a certain time, taking the meteorological evolution into account, reduces its avoidance, making it necessary to return to the initial flight plan over the cleared area.

In current systems, on recent civil or transport aircraft, the management of the flight plan (resulting from the ARINC 424 legs) is generally separate from the management of mission trajectories, in particular:

the aircraft is either in a "flight plan" mode involving the calculation of the trajectory coming from that flight plan, the calculation of the deviations for guiding the aircraft on the specific trajectory and the display of the trajectory;

or the aircraft is in a "mission" mode: the term "mission" is understood to be any alteration of the flight plan by a trajectory such as an avoidance (for meteorological, traffic, relief or threat reasons for example) or a specific "pattern" (of the SAR, drop, refueling or terrain following type for example); the equipment originating the trajectory then sending its instructions directly to the guidance system or to the pilot so that he can follow them;

the systems are therefore segregated, both for the calculations of instruction trajectories and for the guidance of the aircraft, the selection of the navigation sensors, the display to the crew and the communication with the other ground and onboard systems.

There are aircraft in which a third party system, such as a mission system, is connected to the system dedicated to the flight plan (the FMS for example), and transmits to the latter a "mission" flight plan constituted by waypoints in the standardized format of FMS systems, notably conforming to the ARINC 702A and ARINC 424 standards. The mission system does not directly transmit trajectory to the FMS, the latter not being designed to manage an external trajectory; the mission system must therefore generate a format compatible with a flight plan in order to interface with the FMS.

A document FR 2 984 538 A discloses a solution for managing a mission not using the FMS computer, a secondary computer routing the instructions of the FMS and the instructions of the mission system to the guidance system as a function of the type of operation: flight management in non-segregated space or mission in segregated space. This document describes a system with segregated computers without concatenation of the trajectory.

A document EP 2 459 963 A describes an architecture comprising a mission system and a civil system, both of them for the navigation and the communications, in different partitions, making it possible to update the systems independently without recertifying the whole assembly. An FMS controls the civil "navigation and communications" partitions. A mission system controls the tactical "navigation and communications" partitions. It is also a system in the context of segregated computers without concatenation of the trajectory.

The solutions of the prior art, and notably the above ones, are not satisfactory. In known solutions, one dedicated system processes its flight plan, for example the FMS, whilst another system processes its section of trajectory, for example a tactical mission system or an onboard surveillance system. The two systems do not communicate, forcing the crew to make the connections mentally and to switch navigation, communication and guidance modes manually when they change from one section to the other. These solutions therefore require lengthy operations, often on several systems to be coordinated.

In other known solutions, the system dedicated to the flight plan requires third party systems to format their sections of trajectory in order to be able to interface with it. Numerous disadvantages result from this:

the third party systems must have program codes for carrying out the transcription according to the rules of the flight plan system which are often complex, for example in order to generate an FMS flight plan in the ARINC 424 format. The cost is high for the development of these functions which moreover introduce a dependence of the third party system with respect to the capabilities of the system dedicated to the flight plan. This also restricts interchangeability;

the third party systems can create data that will not be accepted by the system dedicated to the flight plan for memory capacity reasons, the number of waypoints for example usually being fixed at 100 or 250 depending on the versions of the FMS systems. This notably limits the operational capability of the function to be carried out if the third party system has to constrain its trajectory so that it is compatible with the interfaces and computing capabilities of the system dedicated to the flight plan;

there is duplication of information when the third party system generates a trajectory to be inserted in a flight plan, this redundancy moreover sometimes being inconsistent because the construction hypotheses of the two systems are not strictly identical to each other;

the trajectory sections can be dynamic, for example in the case of moving buoys for a SAR (Search And Rescue) computer, requiring periodic transmissions of formatted sections not compatible with the CPU performance of the system dedicated to the flight plan. The updating of trajectory at a rate greater than 1 Hz (1 trajectory per second) is impossible to integrate with the present day onboard technologies and hardware of systems dedicated to the flight plan;

the systems dedicated to the flight plan constrain the construction of the lateral and vertical trajectory in order to ensure its "flyability". The geometry is produced in such a way that the instructions sent to the guidance system, constituted by the automatic pilot or by a joystick, to be used there for control are by nature in the flight envelope of the system in question;

the systems dedicated to the flight plan do not have substitution functions allowing the temporary replacement of a part of the portion of flight plan by a trajectory section;

significant excess costs are inescapable for the system dedicated to the flight plan to be able to process the features of the sections from the third party systems, for example the sections that have greater dynamics than the system dedicated to the flight plan can process, such as for example a large roll angle or transitions specific to the third party system which do not exist in a conventional system dedicated to the flight plan.

SUMMARY OF THE INVENTION

A purpose of the invention is notably to overcome the abovementioned disadvantages. For this purpose, the invention relates to a method for the real time calculation of a trajectory followed by a moving object, the said trajectory coming from a planned trajectory, managed by a system, and from at least one trajectory section sent by a third party system to the said system, the said method at least comprising:

a preliminary step in which a knowledge base is produced comprising the calculation parameters and their field of use for the said moving object, at least one envelope of parameters being defined within the said field of use corresponding to different operational constraints of the said moving object;

a first step in which the said system (100) initializes the planned trajectory according to the parameters of the preliminary step, the calculation parameters of the said planned trajectory being contained in one of the said envelopes;

a second step in which the said system receives a trajectory section sent by the third party system in order to be inserted in the said planned trajectory by replacing a part of the said trajectory;

a third step in which the received and accepted section is simplified by segmentation in such a way that its calculation parameters are contained in the said at least one of the said envelopes;

the said system carrying out calculations on the basis of the said simplified section.

In a particular embodiment, several envelopes of different levels of constraints being defined, the calculation parameters of the said section are contained in one of the said envelopes.

The said system integrates for example the equations of the dynamics of the moving body according to the parameters of the simplified section brought into to at least one of the said envelopes. The constraint level of an envelope containing the calculation parameters of the said section is for example lower than the constraint level of the envelope containing the calculation parameters of the said planned trajectory.

The calculation results are for example multiplied by the inverse of the rate of contraction of the said simplified section.

In the third step the system calculates for example the trajectories connecting the parts of the said planned trajectory and of the said section, the said section being calculated to be inserted between these parts using the parameters of the preliminary step corresponding to the type of planned trajectory part replaced.

Several geometries of the said section being sent successively for insertion, the said system carries out for example a filtering so that it inserts a new section geometry only if the latter differs from the geometry of the current section by a difference greater than a given threshold. The given threshold is for example equal to the simplification rate of the said current section.

Several geometries of the said section being sent successively for insertion, the said system carries out the real time calculations on the said section geometries in order to select the section to be inserted as a function of the result of the calculations.

The said section is for example displayed by display means in its real trajectory, the calculations being carried out on the simplified section.

The said system retrieves for example the data of the planned trajectory replaced by the said section in the case of deletion of the latter.

Advantageously, the system can be a flight management system, the planned trajectory being a flight plan trajectory followed by an aircraft. The said section is for example a mission trajectory section. The calculations include for example calculations of prediction of fuel consumption by the aircraft and of times of passage of the aircraft at given points.

The points of transition between the said section and the flight plan trajectory can for example be modified via an interaction on a display screen.

The said method comprises for example a step of configuration of sensors as a function of the mission corresponding to the said section and as a function of parameters of calculations of the said database established in the preliminary step. When the aircraft flies through the said section, it comprises for example a step of configuration of the guidance and piloting systems as a function of calculation parameters of the said section. It can also comprise a step carrying out a formatting of the trajectory information for sending to the clients having requested the insertion of the said section.

The invention also relates to an onboard trajectory management system carrying out real time trajectory calculations using the method described above.

BRIEF DESCRIPTION OF THE DRAWINGS

Other features and advantages of the invention will become apparent with the help of the following description, given with reference to the appended drawings in which.

DETAILED DESCRIPTION

Figure 1:
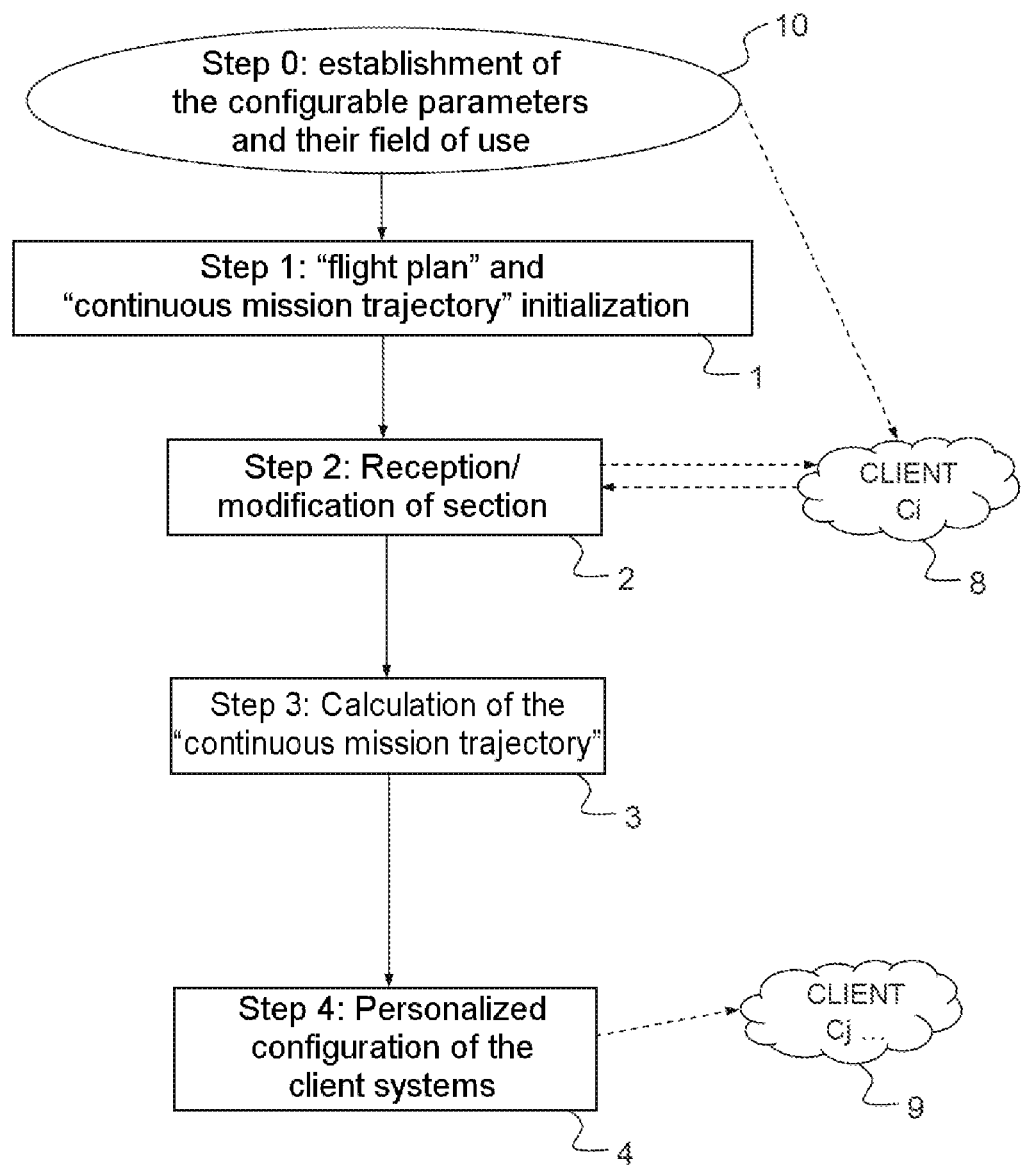
FIG. 1 shows the possible steps for the implementation of the method according to the invention.

FIG. 1 shows the possible steps for the implementation of the method according to the invention. The invention is described for an avionic application, the method notably being applied for the connection of a mission trajectory with a flight plan trajectory.

The invention can also be applied in other fields, notably for naval or motor vehicle applications. In motor vehicle applications, sections of trajectories being for example the alternative routes for avoiding for example a traffic jam, a temporary road works area or an area closed to vehicular traffic.

In a preliminary step 10, the configurable calculation parameters and their field of application are established.

The system dedicated to the flight plan carries out trajectory and prediction calculations whilst integrating the aerodynamic and engine equations of the aircraft. A field of use is defined for the parameters used in the calculations of the flight plan. It corresponds to the capability limits of the aircraft for a particular use, for example the certification limits. This field of use defines an envelope of trajectories. In other words, a trajectory belongs to this envelope of trajectories if its calculation parameters remain confined to within the field of use.

A field of use can be defined by the following constraints:

a civil aircraft carrying passengers must comply with the rules of comfort which limit the load factors. This affects the undertaking of turns in order to limit the centrifugal force, changes of altitude, changes of speed, and also the changes undergone by the trajectories;

the aircraft is certified "safe" by the appropriate authorities in the field of use. Thus, for example, the aircraft is certified over a range of minimum speeds, for avoiding stalls, and over a range of maximum speeds for protecting the structure, as a function of numerous parameters such as the altitude or the weight for example. During takeoff or landing, the aircraft must comply with the defined speed and thrust ranges in order to avoid touching the runway or nearby obstacles.

In another field of use, the aircraft can have different constraints:

for a manoeuvre of avoiding a danger such as a relief, another aircraft or a meteorological event, the surveillance systems can need to carry out temporary maneuvers outside of the habitual margins mentioned above. The vertical avoidance of an aircraft can temporarily generate taking on large vertical load factors for example;

for a mission manoeuvre such as a low altitude flight, an SAR search or avoiding a danger for example, the aircraft can fly with widened margins on the above parameters, notably for tight turns, very dynamic level changes for terrain following, rapid changes of trajectories for following moving buoys or for flying on portions of trajectory with an altitude defined for the correct functioning of sensors.

In this preliminary step, a knowledge base of the parameters associated with the dynamics of the aircraft is produced, with configurable margins for meeting the various constraints, notably those defined above. The algorithms using these parameters are validated and qualified including the said margins. This knowledge base can be stored in a database on board the aircraft, or uploaded from the ground, or directly integrated in the software of the dedicated flight plan system, or on any other suitable media storage means.

Thus, with an existing system, dedicated to flight plans and without modifying the code and demonstration of performance, it is possible to define three levels of parameters envelope, or of trajectories, used in the calculations, and corresponding to different flight constraint levels. For avionic applications, it is possible to define, from the most constrictive level to the least constrictive level:

a minimalist envelope level corresponding to commercial certification, limiting the parameters to values and uses making it possible to demonstrate the conformity with the navigability requirements defined by the international civil aviation authorities;

a wider envelope level, corresponding to the aircraft manufacturer's demonstration, limiting the parameters to values and uses making it possible to demonstrate the conformity with the performance requirements of the aircraft manufacturer. This makes it necessary to know the limits within which the algorithms guarantee correct properties notably in terms of accuracy and reliability. In general it is a matter of the system designer providing the aircraft manufacturer client with a performance declaration document. It is also advantageous for the aircraft manufacturer not to have to repeat a demonstration of performance when he slightly modifies a parameter of his aircraft. In the context of development of systems in production lines, the designer can also demonstrate a flight envelope wider than the certification envelope in order to reuse the trajectory and prediction calculation software modules in other aircraft without having to repeat the safety demonstration;

an even wider envelope level, corresponding to a guaranteed robustness, in which the designer demonstrates the robustness of his algorithms, and notably the capabilities of providing a result in this envelope without breaking down, even with reduced reliability, resulting for example in degraded accuracy.

Figure 2:
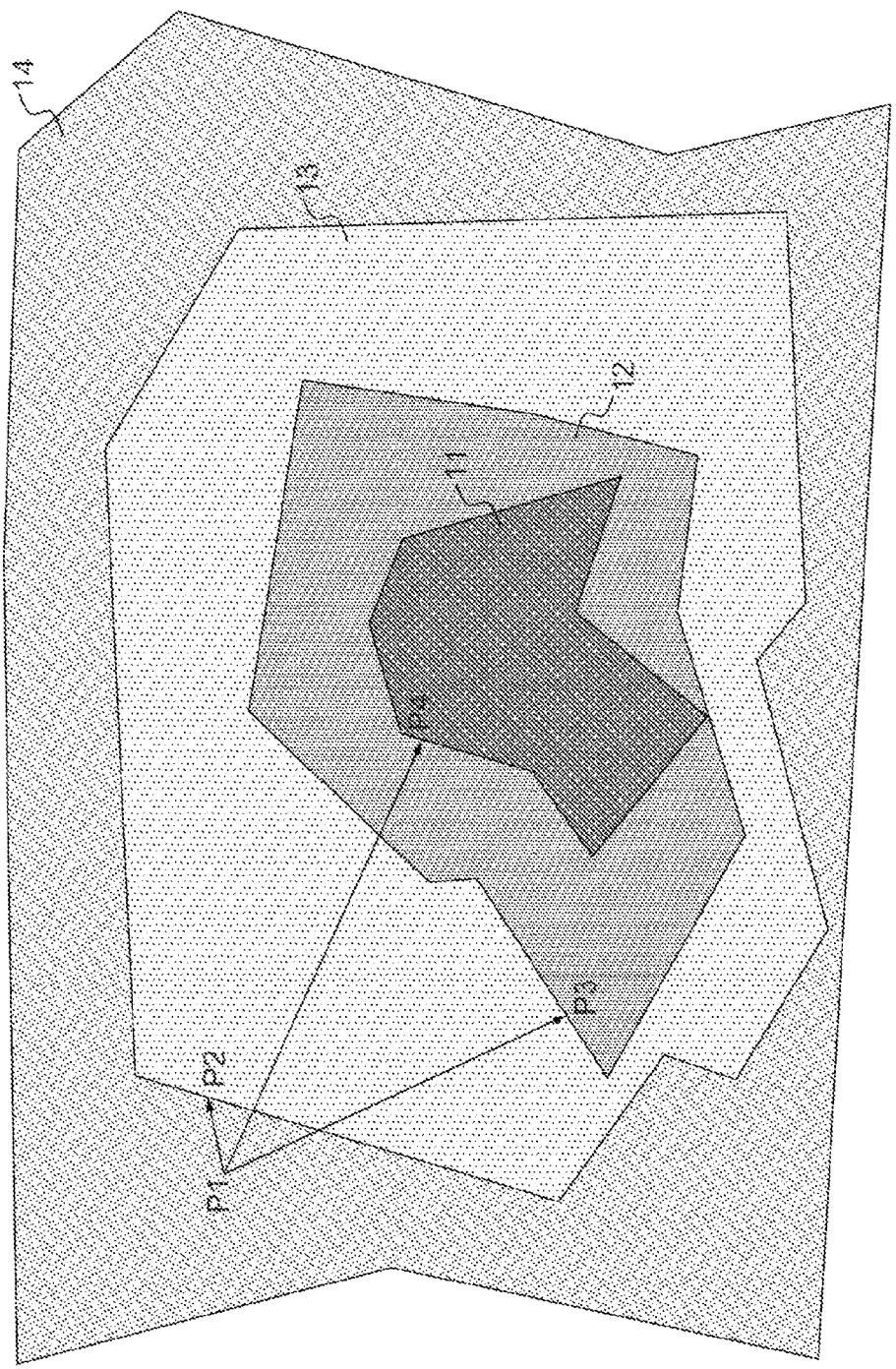
FIG. 2 shows three levels of management of envelopes of trajectories.

FIG. 2 shows these three levels of management of envelopes. The commercial certification envelope 11 is included in the aircraft manufacturer's demonstration envelope 12, which is itself included in the guaranteed robustness envelope 13.

When a third party system wishes to make a demand on the system dedicated to the flight plan with a parameter P1 situated outside 14 of these three envelopes, the system dedicated to the flight plan can use either its limitation by the robustness envelope 13 (parameter P2), or by the aircraft manufacturer's envelope 12 (parameter P3), or by the certification envelope 11 (parameter P4).

The list below is a non-exhaustive and non-limiting list of the trajectory parameters used by a function dedicated to the flight plan and whose boundaries can be extended for the third party systems within the limit of the above envelopes 12, 13. This list could contain:

List of the authorized and prohibited geometries for a third party system (makes it possible to define the interface between a third party system and the "flight plan dedicated system":

Latitude/longitude points only

Points defined relatively by other points

Authorized and prohibited Arinc 424 Legs

Straight lines and arcs of circles including their definition:
  Straight line between two Latitudes/Longitudes
  Straight line coming from a latitude/longitude, with a length and a given heading or a given ground route
  Arc characterized by its centre (latitude/longitude) its radius, its orientation, its starting angle (with respect to North for example) and its apcentral angle
More complex geometries for the arcs: ellipses for example, stationary points (typically for helicopter "hovering")
Maximum roll
Maximum roll speed
Maximum pitch
Maximum pitch speed (positive and negative)
Maximum attitude (positive and negative)
Maximum Incidence (positive and negative)
Min and max flight path angle (FPA) (positive and negative)
Minimum and maximum speeds according to aerodynamic configurations
  The speeds are for example: ground speed (GS), true air speed (TAS), Mach, calibrated air speed (CAS), vertical speed (Vz)
  The configurations are for example: settings of slats and flaps, airbrakes, landing gear, protruding elements (doors, perches, radar pods . . . )
Maximum and minimum altitudes
Max and min turn radiuses (for the curves)
Maximum acceleration
Maximum deceleration
Maximum lateral and vertical load factors
Minimum and maximum thrust
Obligatory types of transition and prohibited types of transitions (among "Fly over", "Fly by", flat arrival, flat departure
Maximum lateral joining angle from a transition to the following leg
Obligatory mode of altitude change, and prohibited mode of altitude change
  The modes are for example: fixed Vz, fixed FPA, fixed thrust "Open"
A non-exhaustive list of the flight plan parameters used by a function dedicated to the flight plan and whose boundaries are extended for the third party systems could contain:
  List of additional A424 legs, authorized and prohibited among the 13 types of legs
  Authorized and prohibited transitions between legs (extension of possible and impossible pairs, defined by Arinc 424 to other pairs)
    For example: Addition of the Arinc 424 transition DF-RF (Direct to Fix—Radius to Fix) making it possible to join an arc by a direct line.
  Definable min and max fight plan constraints on the "flight plan" legs: altitude, speed and time constraints
    For example: Addition of 'AT OR FASTER' speed constraints, whereas the "flight plan dedicated" systems can only take account of 'AT OR LESS' speed limits
  Flight plan sequencing rules
    For example: blocking of sequencings on an SAR upon which an excursion is carried out in order to go and look further.

A non-exhaustive list of navigation parameters used by a function dedicated to the flight plan and whose boundaries are extended for the third party systems could contain:
  Authorized and prohibited sensors and detectors (including multi-sensor configurations):
    For example: civil GPS, tactical GPS, Galileo, Gagan, Glonass, . . . Radars, satellite enhancements, Inertial systems, Radio-navigation beacons of the VOR, DME, TACAN, ILS, MLS, ADF etc. type
  Obligatory or prohibited Frequency Bands.
The parameters listed in the base of the preliminary step 10 have a default value which can be:
  Defined in advance, in the code;
  Defined in a default configuration file, uploaded when the aircraft starts;
  Defined dynamically via a loading by a storage means or by digital data link;
  Defined via a Man-Machine interface by an on-board operator.

Referring again to FIG. 1, the preliminary step 10 is followed by a first step 1 of initialisation of the flight plan and of the continuous mission trajectory. This step, carried out by the system dedicated to the flight plan, conventionally consists of constructing a trajectory on the basis of the flight plan alone, with the parameters defined by default in the preliminary step 10.

The system calculates the lateral transitions between legs of the flight plan according to the lateral trajectory and flight plan criteria, and carries out in parallel or immediately afterwards an integration of the vertical flight plan according to the chosen vertical parameters.

A second step 2 manages the reception of a third party trajectory by a third party system, this third party trajectory being represented by a section. More precisely, in this second step, the system dedicated to the flight plan manages the reception of the section, its modification or its deletion if it cannot be integrated. After analysis of the section by the system and if it is accepted, the system carries out its formatting in order to prepare its insertion in the trajectory. For this purpose, the system calculates the boundaries, also called pivots, of the portion of flight plan trajectory that will be replaced by the section.

Figure 3:
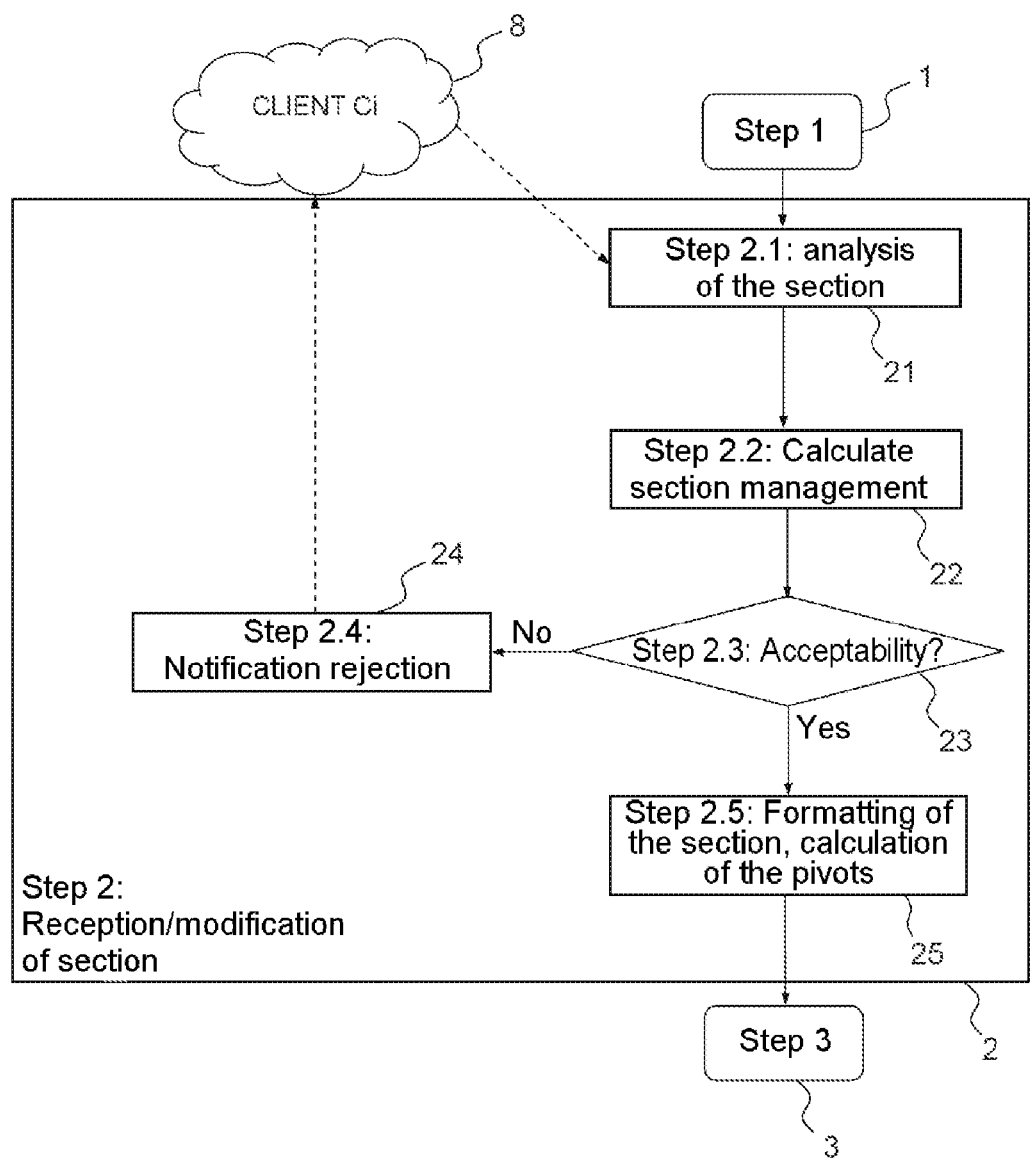
FIG. 3 shows possible sub-steps of the second step.

FIG. 3 illustrates this second step 2 by showing its possible sub-steps. A first sub-step 21 analyses the section received from the client 8. In this step, the system dedicated to the flight plan receives a section of trajectory from a third party system, that is to say the client 8 in FIGS. 1 and 2. The analysis notably relates to the following characteristics:
  The transmitting system
  Type of revision requested by the third party system: addition of a new section, modification of an existing section (replacement), deletion of a section
  Types of geometric elements used:
    2D trajectory: (legs, straight lines, arcs, . . . )
    2D+V (speed) trajectory: 2D trajectory integrating a specified speed per segment of the section
    3D trajectory: 2D trajectory integrating the altitude variation per section segment
    3D+V trajectory: 3D trajectory integrating a specified speed par segment of the section
    "Vertical only" trajectory: on the existing flight plan, integration of a specified speed profile (purely vertical section, superimposed on the flight plan)
    Any other combination between the aircraft axes and speed or time axes Parameters coming from step 0 applicable to the section corresponding to the default transmitter or provided by the latter dynamically, such as for example:
    sensors to be used on the section
    particular guidance parameters to be used on the section
presence of a "flight plan" start point (optional) and of a "flight plan" end point (optional) respectively indicating at which point of the "flight plan" the method must change into mission mode for the third party system and at which point of the "flight plan" the method must end the mission of the third party system in order to resume the calculation with the "flight plan" hypotheses.

In a second sub-step 22, the system calculates the management of the section. In particular it checks if the section meets the conditions for being integrated in the existing flight plan, these conditions notably being:
  Syntax Conditions
    Verifications of the values of the parameters with respect to the field of use defined in step 0
    Syntax checks (numbers in correct format, alphanumeric characters authorized for a parameter)
  Performance Conditions (CPU, RAM/ROM, stack size . . . )
    Number of geometric elements (straight lines, arc) added with respect to the maximum number of trajectory elements authorized on input to the "flight plan dedicated" system (i.e. before the simplification step)
  Geometric Conditions (capability of linking the section to the flight plan)
    Consistency of the elements used to define the Straight lines and arcs (for example: for an arc of circle of RF type, the radius is consistent with the distance between the centre and the point of exit from the arc)
    Distance consistency with respect to the flight plan: the section of trajectory has consistent conditions of separation from and intersection with flight plan, the pivots proposed by the third party system exist in the flight plan, the pivots are consistent with the flight plan, that is to say in the correct order for example . . . .

In a sub-step 23, the system carries out a filtering of the section by the acceptability criteria in the existing flight plan, on the basis of the analysis 21 and of the calculation of management 22 of the section. More particularly, this sub-step routes the method to one or other of the following two possible steps 24, 25.

In the case of refusal to integrate the section in the flight plan, the system notifies 24 the third party system 8 of the rejection of the request. A status is for example sent to allow the third party system to adapt the trajectory. This status indicates for example:
  A syntax error;
  A performance problem resulting for example in a full flight plan, a full trajectory or a maximum number of sections reached;
  An error in a geometric element, the incriminated element being provided in the said status.

In a sub-step 25, in the case of acceptance of the section in the system, the latter identifies, in its data structure of the flight plan, the cut-off area, in particular the start pivot point and the end pivot point, where the trajectory proposed by the third party system will be inserted, a pivot being a point of transition between the section of a system, in this case the flight plan trajectory, and the section of another system, in this case a third party trajectory to be inserted.

These pivot points may or may not correspond to points already identified in the data structure of the flight plan. The result of this sub-step 25 makes it possible to move on to the step of insertion of the third party trajectory in order to constitute the continuous mission trajectory.

Figure 4A:
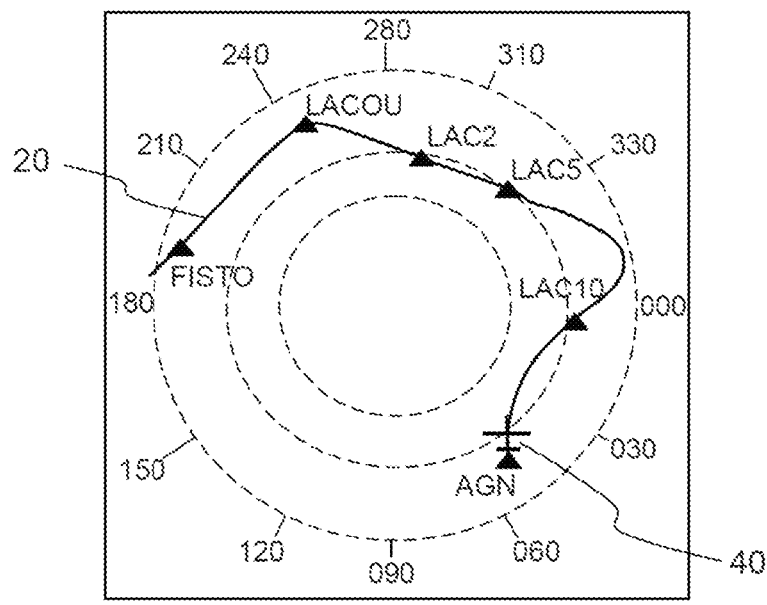
FIGS. 4a and 4b show an example of a third party trajectory to be inserted in the trajectory of the flight plan followed by an aircraft.
Figure 4B:
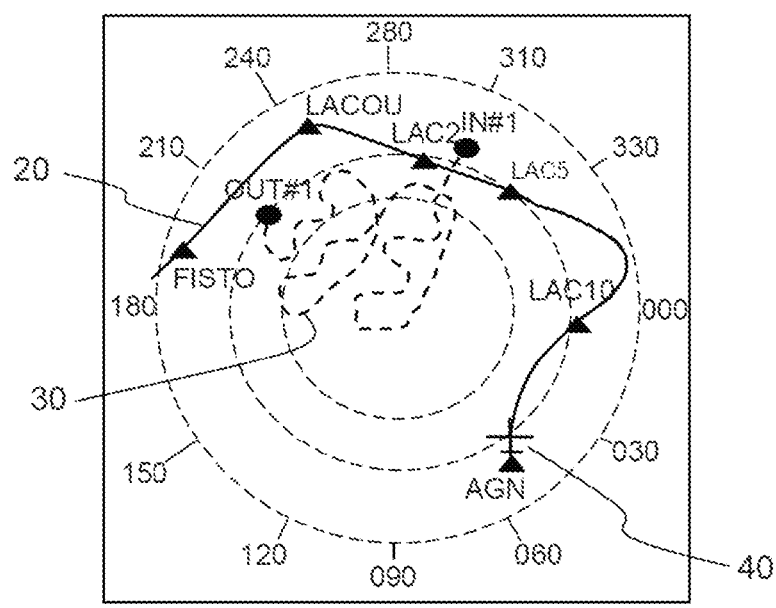

FIGS. 4a and 4b show the third party trajectory to be inserted in the trajectory of the flight plan followed by an aircraft 40. More precisely, FIG. 4a shows the initial trajectory 20 of the flight plan calculated by the system and FIG. 4b shows a third party trajectory section 30 with respect to the initial trajectory 20. A third party system wishes to insert this section of trajectory 30 in the initial trajectory.

FIG. 4a corresponds to the representation of the initial flight plan displayed on a navigation screen (Navigation Display) notably comprising the points AGN, LAC10, LAC5, LAC2, LACOU, FISTO. In FIG. 4b, the system determines the point of entry IN#1 and the point of exit OUT#1 of the trajectory and calculates for example the pivots by the method of projections. Thus, the entry pivot "PIVOT IN #1" of the third party trajectory is for example the point LAC5 on which the entry point IN#1 has an orthogonal projection of minimum distance. Similarly, the exit point "PIVOT OUT #1" is for example the point FISTO on which the exit point OUT#1 has an orthogonal projection of minimum distance.

In an optional implementation, the pivots can be modified by the pilot, by selection of another element in the cartouche as shown in FIGS. 4a and 4b, or by a suitable mode of interaction, directly on the screen (using a cursor, a drop-down menu, a touch interface or any other means of man-machine interaction).

Referring again to FIG. 1, in a third step 3, the system dedicated to the flight plan calculates the continuous mission. This step integrates the third party section in the flight plan in order to derive the continuous mission trajectory from it. It therefore notably consists of attaching the entrance and exit of the section to the present elements of the flight plan, and of carrying out the trajectory and prediction calculations according to the corresponding modes.

Figure 5:
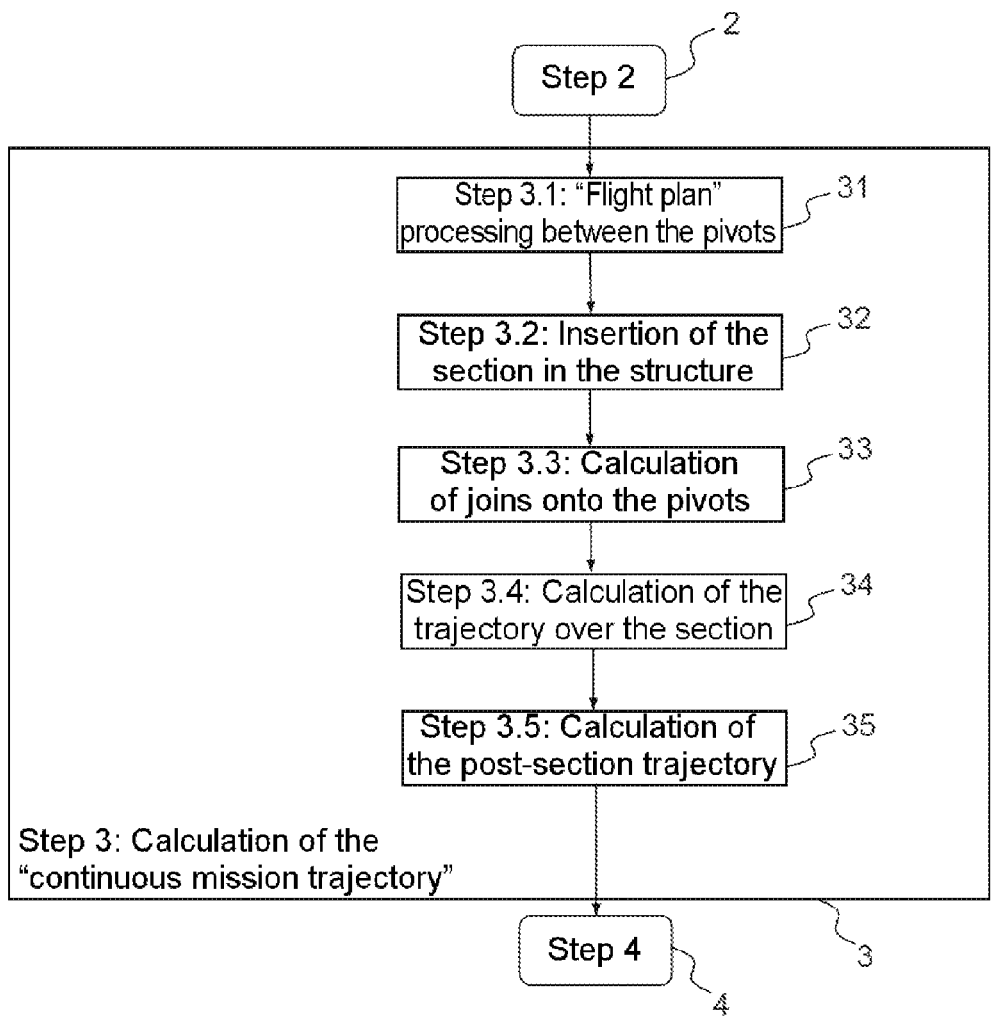
FIG. 5 shows the possible sub-steps of the third step.

FIG. 5 shows the possible sub-steps of the third step 3. In a first sub-step 31, the method carries out the "flight plan" processing between the pivots. If the entry and exit pivots are different, as is the case in FIG. 4b, the method saves the intermediate flight plan elements which will be deleted in the third sub-step 33 in order to make room for the section so that they can be retrieved in the case of deletion of the section or of modification changing its geometry with respect to the flight plan.

In a second sub-step 32, the section is inserted in the structure. The internal conversion of the trajectory is carried out in order to bring it within the envelope of trajectories of the system dedicated to the flight plan.

The method carries out a formatting adapted for the prediction calculations by the system dedicated to the flight plan and internal storage in the system. This trajectory is a third party trajectory, for example a mission trajectory, to be connected to the flight plan trajectory. More precisely, this adapted formatting consists of a simplification of the section of trajectory in such a way that the trajectory remains within the defined trajectory envelope, notably with regard to the parameters of calculations and of storage by the system dedicated to the flight plan. This envelope can be the commercial flight certification envelope 11, the aircraft manufacturer demonstration envelope 12 or the robustness envelope 13, depending on the applications, it being possible to define other envelopes of trajectories. The real time calculations, notably the calculations of predictions, are carried out on the basis of the simplified trajectory, an estimation can then be made if necessary in order to define the prediction relative to the real trajectory. For example, the prediction of fuel consumption is calculated on the basis of the simplified trajectory and then the consumption difference from the real trajectory is estimated in order to result in the consumption prediction calculation of this real trajectory.

The method according to the invention, thus carries out an optimized geometric processing of a section of trajectory allowing its insertion in the computer dedicated to the flight plan whilst at the same time guaranteeing the performance of the storage of the sections, the CPU performance for the subsequent calculations and the final accuracy of the calculations obtained. The sections are simplified from the trajectory point of view and predictions calculations for obtaining correct predictions (passage time, fuel consumed . . . ) without calling into question the field of use of the trajectory and prediction calculation parameters of the system dedicated to the flight plan.

Figure 6:
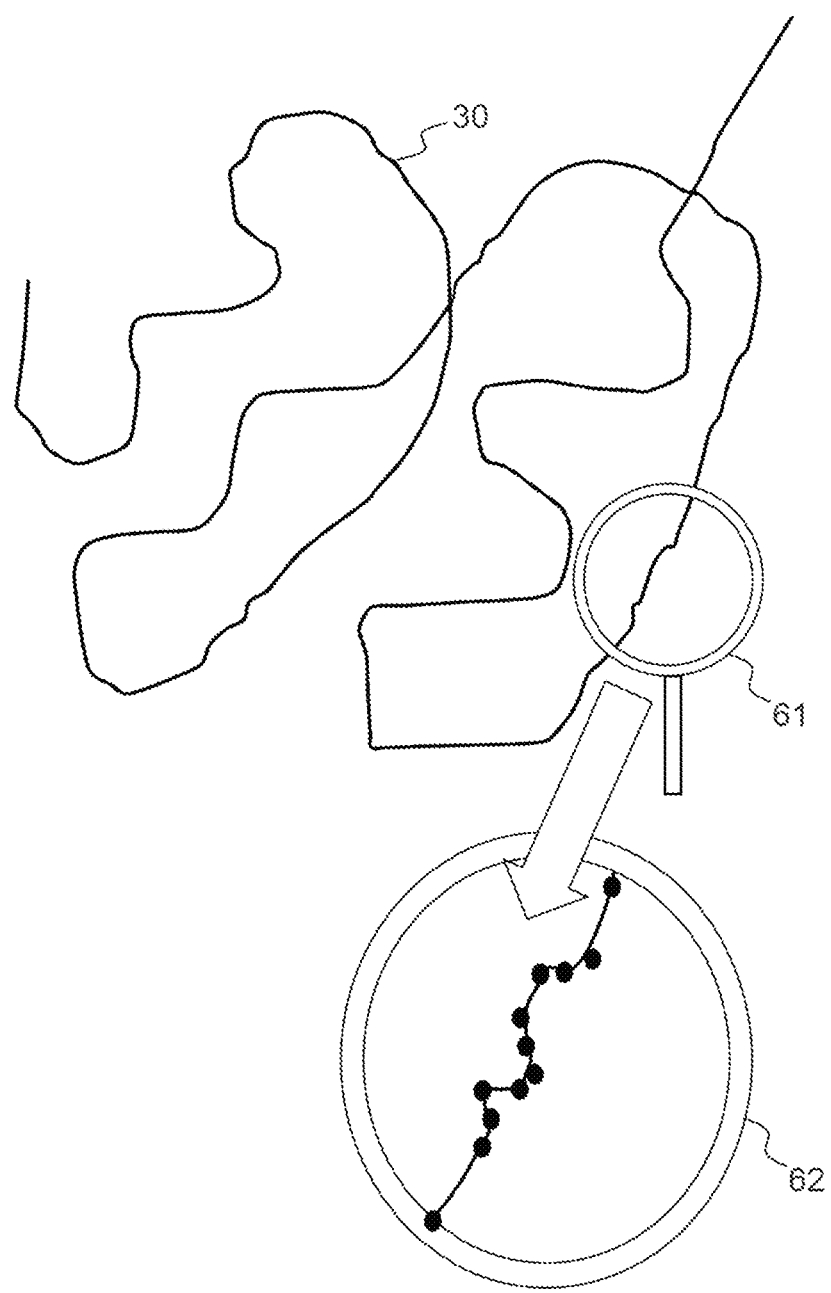
FIG. 6 shows the quantity of segments composing a trajectory.

The initial section 30 at the entry of this sub-step 32 can be constituted by numerous segments, notably if the expected dynamics are large. Typically, the section 30 can comprise several hundred segments for a mission of a few dozen nautical miles. FIG. 6 illustrates this large quantity of segments. It shows the section of trajectory 30 to be inserted with a section 61 for which a zoomed view 62 has been shown. The zoomed part, of very short distance compared with the whole of the section 30, alone shows 12 breakpoints.

The method limits the input parameters of the third party system according to the choice (hard-configurable, selectable by the pilot or by the third party system) of envelopes from among the available calculation envelopes defined in the preliminary step 10.

At the minimum, the method brings the data of the third party system into the robustness envelope 13.

Advantageously, the method adjusts the data and parameters of the third party system in order to meet an accuracy requirement: it brings the parameters into the aircraft manufacturer 12 or the certification 11 envelope, according to the accuracy required for the calculations. In fact, even though this modifies the resultant trajectory to a greater degree, the use of these envelopes makes it possible to know the accuracy that will be obtained at the end of the calculation in a deterministic manner.

The method thus determines the possible trajectory dynamics for the rest of the calculations. For example, for a fixed wing aircraft, the turns making it possible to change heading are defined by an arc, whose turn radius is equal to: $R=V^2/(g*\tan(phi))$ where V is the speed with respect to the ground, g is the gravitational constant and phi is the roll angle. Going into a turn is a function of the roll speed Vphi.

The minimum and maximum values of V are notably dependent on the altitude, the meteorology (wind speed) and the weight of the aircraft.

The maximum values of phi and Vphi are notably functions of the altitude, the state of the aircraft and the passenger comfort rules (maximum load factor during a turn for example).

Thus, the method can calculate the target values of turn radiuses R along the section. The method recalculates the turns of the initial section using the turn radius hypotheses.

The method then determines the resultant length of the section, and the impacts on the predictions. In particular, the simplification results in slightly different predictions of the modelled wind and has an impact on the time and fuel predictions that it is possible to estimate. For example, the time and fuel predictions over the section can be those coming from the calculation over the simplified section, multiplied by the inverse of the contraction rate between the length of the initial trajectory and the resultant simplified trajectory length. More generally, the calculation results, notably of the real time or prediction calculations over the simplified section, are multiplied by the inverse of the contraction rate in order to obtain a final result appropriate for the initial trajectory (real trajectory).

In an alternative and for reducing the number of segments even more, the method ignores the turns in its calculations. The trajectory becomes a succession of straight lines.

Figure 7A:
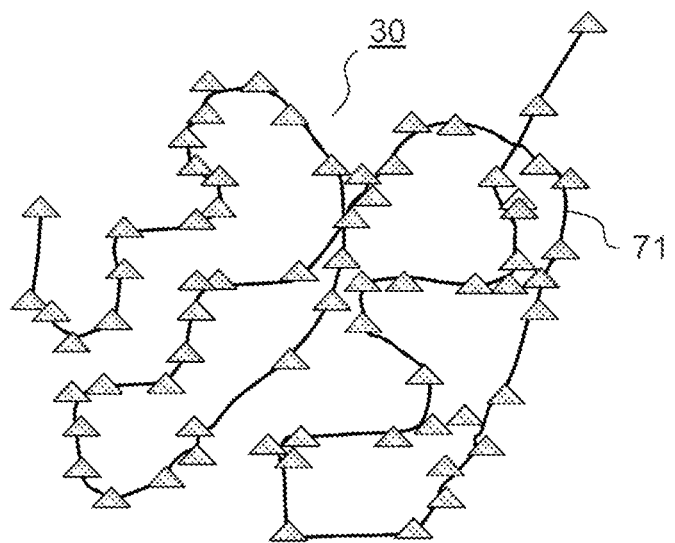
FIGS. 7a and 7b show two examples of simplified trajectories.
Figure 7B:
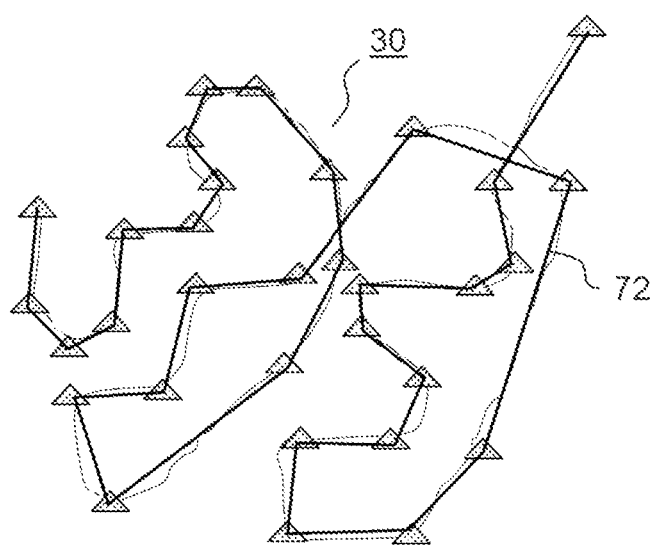

FIGS. 7*a* and 7*b* show two examples of simplified trajectory, the original trajectory still being the trajectory 30 shown in FIGS. 4*a* and 6. FIG. 7*a* shows the simplified trajectory 30 with 68 segments 71 including the arcs. FIG. 7*b* shows a further simplification where the arcs are ignored and where the simplified trajectory comprises 31 segments 72, the segments then being straight line segments. Advantageously, the prediction calculations are carried out by the system dedicated to the flight plan over these simplified trajectories, provided that all of the calculations and parameters remain contained within a chosen envelope 11, 12, 13.

In the case of FIG. 7*a*, the length difference with respect to the trajectory is 1%. In the case of FIG. 7*b*, the length difference is 5%. Knowledge of this difference can be used for the calculation of the predictions over the real trajectory from the predictions calculated over the simplified trajectory.

The dynamic sections are also processed in this second sub-step 32. A dynamic section is understood to mean a section sent by a third party system whose geometry varies periodically, for example a trajectory of following buoys at sea or a trajectory of following a moving object. In this case, several geometries of the section 30 are sent successively to the system dedicated to the flight plan. A filtering mechanism makes it possible to recalculate a section only if a significant change of geometry is detected. In practice, the geometry of a trajectory is detected by its coordinates. The method carries out the subsequent calculations over a new section only if its geometry differs by a difference greater than a given threshold with respect to the current geometry. This threshold can be taken as equal to the rate of simplification of the section. Thus, if for example a 5% simplified trajectory is used, as is the case of FIG. 7*b*, the method carries out the calculations subsequent to this sub-step 32 only if the new section differs from the current section by a difference of more than 5%. This advantageously makes it possible to retain the memory and computation performance of the system dedicated to the flight plan.

Even though a third party trajectory section is filtered, it is nevertheless displayed on the screens intended for the crew. This doubling of the trajectory, calculated trajectory and displayed trajectory, advantageously allows a third party system de gauge several alternative sections. While the real trajectories are displayed, the third party system can send different sections and retrieve the results of the predictions (fuel time still available for example) in order to choose the optimum section. Another advantage is that, as seen by the aircraft or by the crew, the trajectory is unique, avoiding consistency problems. In other words, the clients deal with only one trajectory.

Figure 8A:
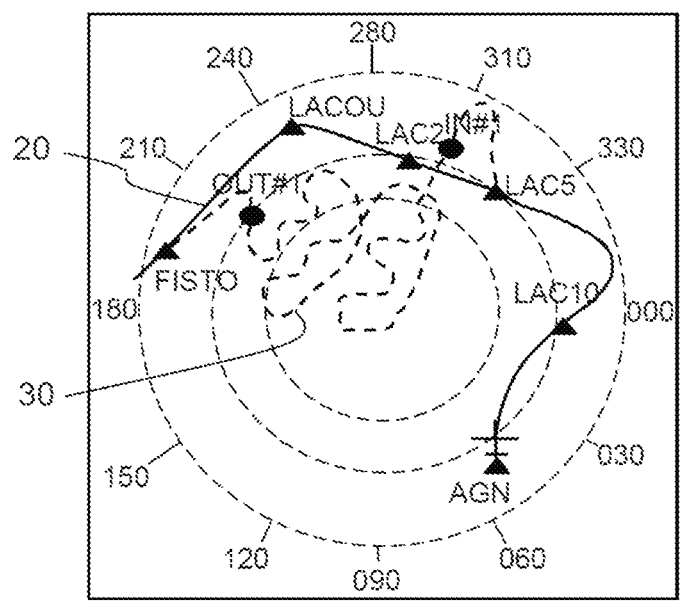
FIGS. 8a and 8b show the placing of two trajectories end to end.
Figure 8B:
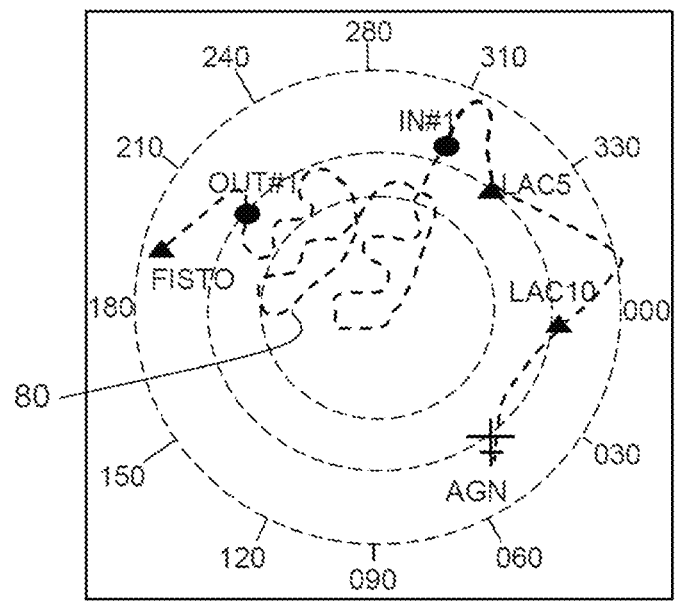

In a third sub-step 33, the calculation of the joins is carried out, that is to say the calculation the trajectories for connecting the parts of trajectory 20 of the flight plan and of the third party trajectory 30, the third party trajectory being inserted between these two parts. FIGS. 8*a* and 8*b* illustrate these joins.

The system calculates the trajectory between the entry pivot LAC5 and the entry point IN#1 of the section 30. It uses the parameters of the preliminary step 10, corresponding to the type of flight plan replaced. In the same way, the system calculates the trajectory between the exit point OUT#1 of the section and the exit pivot FISTO. FIG. 8*a* shows the original trajectory of the flight plan 20 and the joined third party trajectory 30. The part of the flight plan comprised between the pivots LAC5 and FISTO is then eliminated from the trajectory. In one option, this eliminated part can be stored by the method so that it can be retrieved later and re-inserted if, for example, the mission section which replaces it is deleted. FIG. 8*b* shows the new continuous mission trajectory 80 that is obtained.

All known types of joining can be used. It is possible to use a join which minimizes the fuel consumption, which minimizes the distance or which makes it possible to arrive aligned with the start of the section 30 for example. In the examples of FIGS. 8*a* and 8*b*, the joins have been calculated to allow the aircraft to arrive and to depart aligned with the entry and the exit of the section 30.

In a fourth sub-step 34, the calculation of the trajectory over the section is carried out. For this purpose, the method notably integrates, over the flight plan, the equations of the dynamics of the aircraft according to the parameters of the simplified section, for example at least brought within the robustness envelope 13. The system takes for example as its calculation parameters:

the parameters of the certification envelope 11 for the parts of the initial flight plan;

the appropriate parameters for the parts of trajectory of the section 30, from among the robustness guarantee 13, aircraft manufacturer 12 or certification 11 envelopes.

In a fifth sub-step 35, the calculation of the post-section trajectory is carried out. The trajectory simplifications and the joining calculations are carried out in the same way for all of the sections.

The system integrates the equations of the dynamics over the flight plan by taking as calculation parameters the parameters of the certification envelope as far as a next section of trajectory. There is thus available, at the output of the third step 3, a continuous mission trajectory mixing elements and parameters of the flight plan and of the section of trajectory 30.

Referring again to FIG. 1: in a fourth step 4, the personalized configuration of the client systems is carried out. At the end of the calculation of continuous mission trajectory 80, this calculation including all of the prediction calculations, the client systems of this trajectory 80 are configured as a function of the type of section flown through. After the calculation of the modified flight plan integrating the different sections 30, this fourth step makes it possible to communicate the result with the correct configurations to the whole set of client systems.

Figure 9:
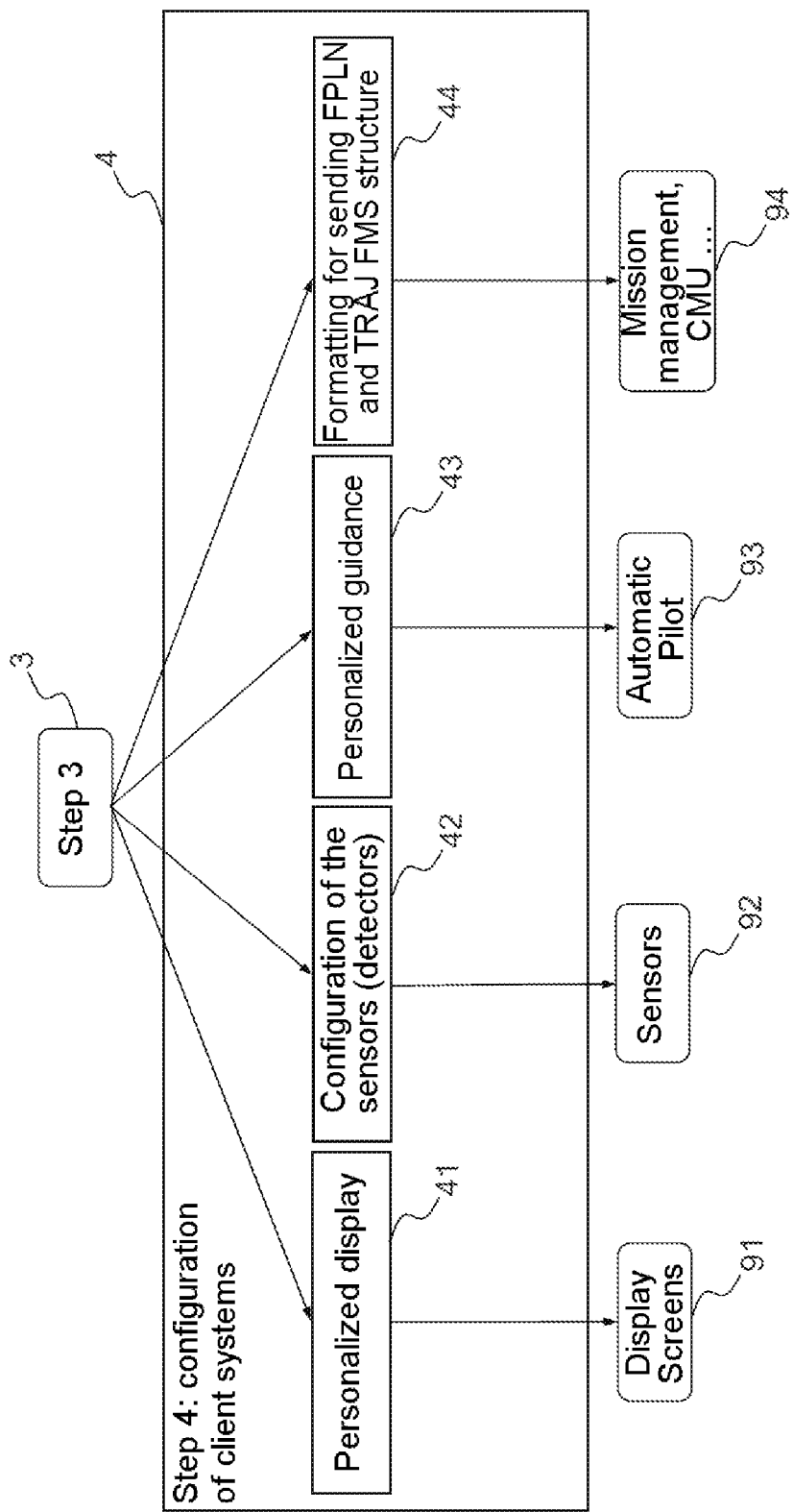
FIG. 9 shows different possible steps of personalized configurations of third party systems.

FIG. 9 shows the different steps of possible configurations. There is no particular order in which to carry out these. The list is not limitative. It is also possible to not carry out all of these steps, other personalized configuration steps of the client systems clients being possible. These configurations are for example carried out by the system dedicated to the flight plan.

Figure 10A:
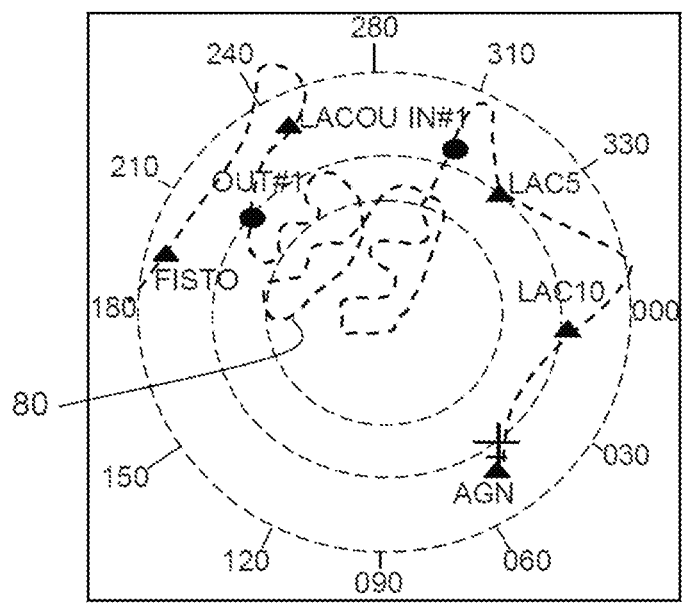
FIGS. 10a and 10b show interactivity and display in the context of validation of a section of trajectory to be inserted.
Figure 10B:
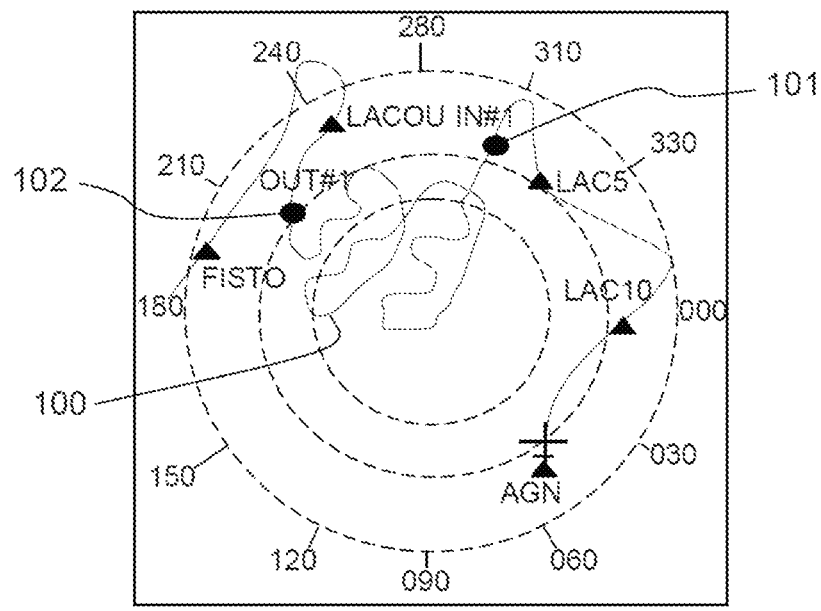

A first step 41 relates to interactivity and to personalized display. The method allows the crew to modify the pivots as shown in FIG. 10*a*. The exit pivot LACOU replaces the pivot FISTO calculated during the second step 2. The crew can validate the section. In FIG. 10*b* a personalized display shows the modified and validated flight plan 100, integrating the section 30 with personalized display on the screen, with a special symbolism 101 for the entry point IN#1 and the exit point OUT#1.

The method makes it possible to delete a section. In this case, the points of the flight plan comprised between the pivots and which had been deleted are reintegrated in the flight plan in order to return to the original flight plan, in the case where the storage has been carried out, according to one of the options of the sub-step 33.

Figure 11A:
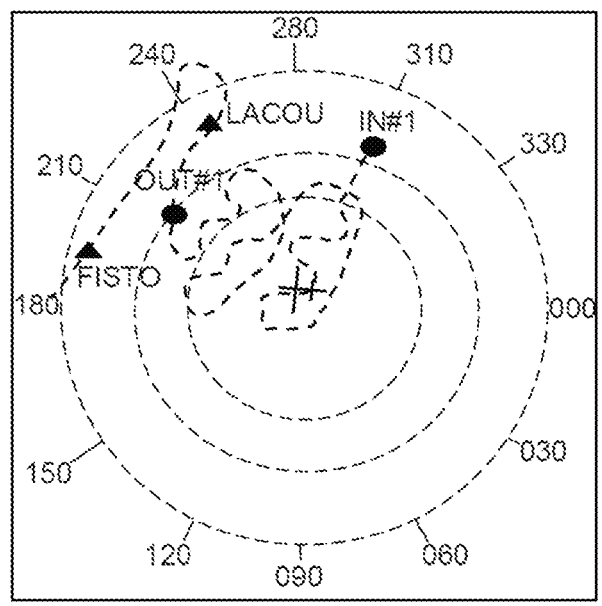
FIGS. 11a and 11b show interactivity and display in the context of deletion of an active section.
Figure 11B:
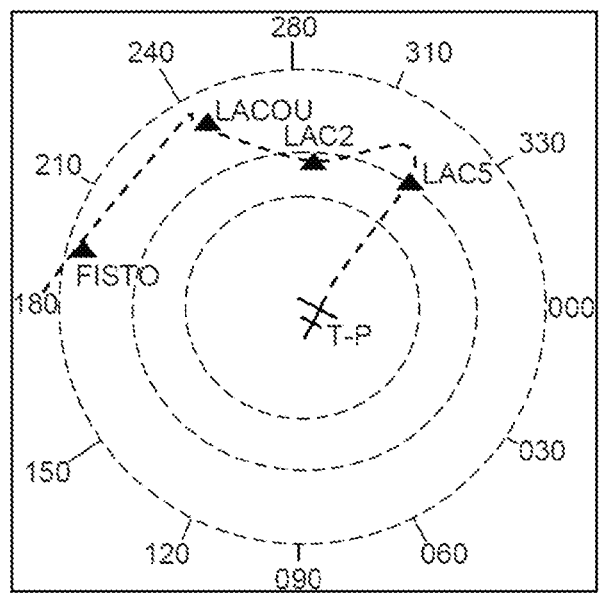

In the example shown in FIGS. 11*a* and 11*b*, the crew decides to delete the section during the flight over this section. The point LAC5, forming a pivot, and the point LAC2 are brought back into the structure of the flight plan. The method creates for example a direct trajectory returning to the pivot LAC5 and following the original flight plan as shown in FIG. 11*b*.

Depending on the performance the display system, the original section 30 or its simplified form, resulting from the third step, is displayed. An advantageous presentation consists of displaying the real original trajectory whereas the calculations are carried out for the simplified trajectory.

Another possible step 42 is the configuration of the sensors. The purpose of this step is notably, when a section is active, that is to say when the aircraft is between the points IN#1 and OUT#1 of the section, to parameterize the sensors in conformity with the mission which corresponds to the section. For this purpose, the system retrieves the parameters identified during the first sub-step 21 of the second step, among the parameters defined in the preliminary step and sends them to the corresponding systems of sensors.

For example, a section of the "search at sea" type can configure the optronic sensors, for example the cameras in the visible light range, the infrared cameras, the tracking cameras, and/or the onboard sonar buoy sensors. A section of the "avoid radar threat" type can configure the onboard sensors to go into silent mode, the active sensors emitting waves in order to receive a response being deactivated during the section. In the case of going through a section of the "avoidance of radar threat" or "low altitude flight" type, a terrain radar can be activated. For a section of the "traffic avoidance" type, the mode S radar of the TCAS can be activated in order to widen the cone of reception of other aircraft.

Another possible step 43 deals with the personalized guidance. This step 43 notably has the purpose, when a section is active, of parameterizing the guidance and piloting systems. In this step, the parameters identified in the second sub-step 32 among the parameters defined in the preliminary step 10 are retrieved and they are sent to the corresponding client systems 9.

These parameters can be of several types:

the designation of the characteristics of the section being carried out by its name or its type or the third party system "guiding and piloting" the aircraft over the section according to its characteristics;

the designation of the trajectory parameters of the section being carried out by the system dedicated to the flight plan when the latter is in possession of these parameters, for example the maximum roll allowed.

Another possible step 44 carries out the formatting for sending. In particular, when a client system 9 requires the receiving of trajectory information in "flight plan" format and/or in simplified format, in the form of segments of arc 71 or of straight lines 72, the method calculates the segments and the corresponding flight plan.

Figure 12:
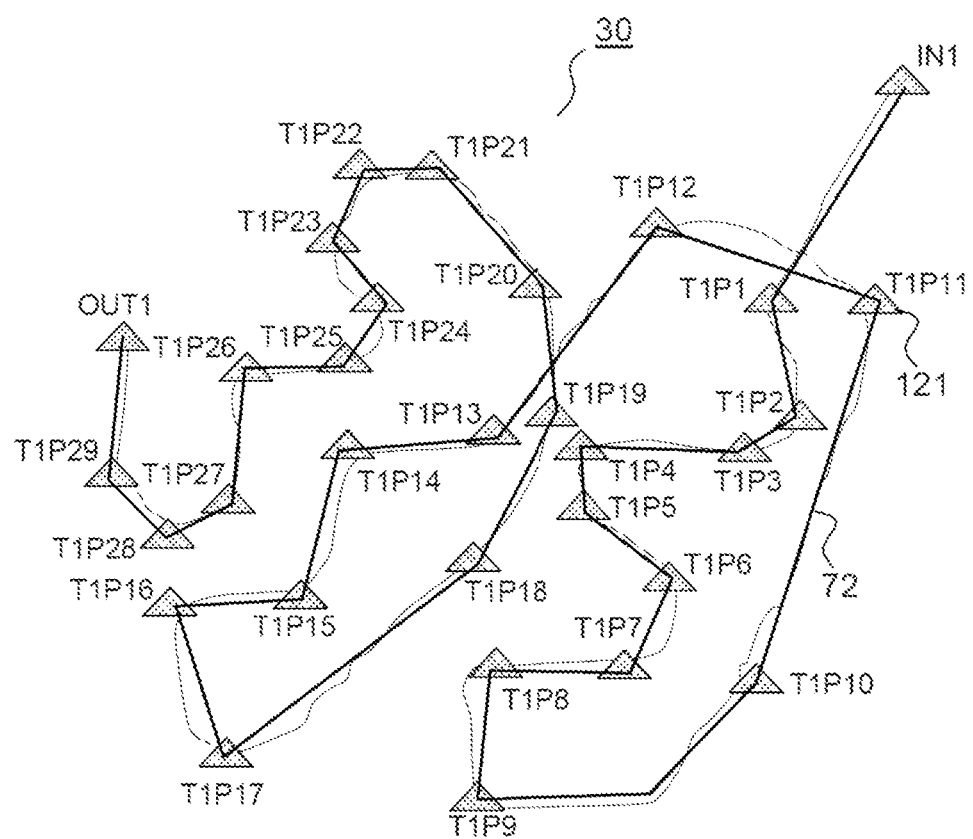
FIG. 12 shows an example of formatting a trajectory.

For this purpose, the method uses the simplified trajectory resulting from the third step, either the one resulting from the arcs 71, or the one resulting from the straight segments 72. FIG. 12 shows the formatting for the second case, relative to the section example 30 of the preceding figures. For each break point 121, the method creates a waypoint according to the interface standard expected by the client system. For example, for an exchange by digital data link with an operator on the ground (AOC: airline company, ATC: air traffic control centre, CC: control centre for example), the method creates waypoints of the flight plan type with their characteristics, these characteristics notably being the 2D or 3D geographic position or the speed constraints.

The invention has been described above for an avionic application. The method according to the invention can therefore advantageously be used by a flight management computer, called an FMS (Flight Management System), or in the flight management (FM) function of a computer, notably dedicated to the flight plan.

Figure 13:
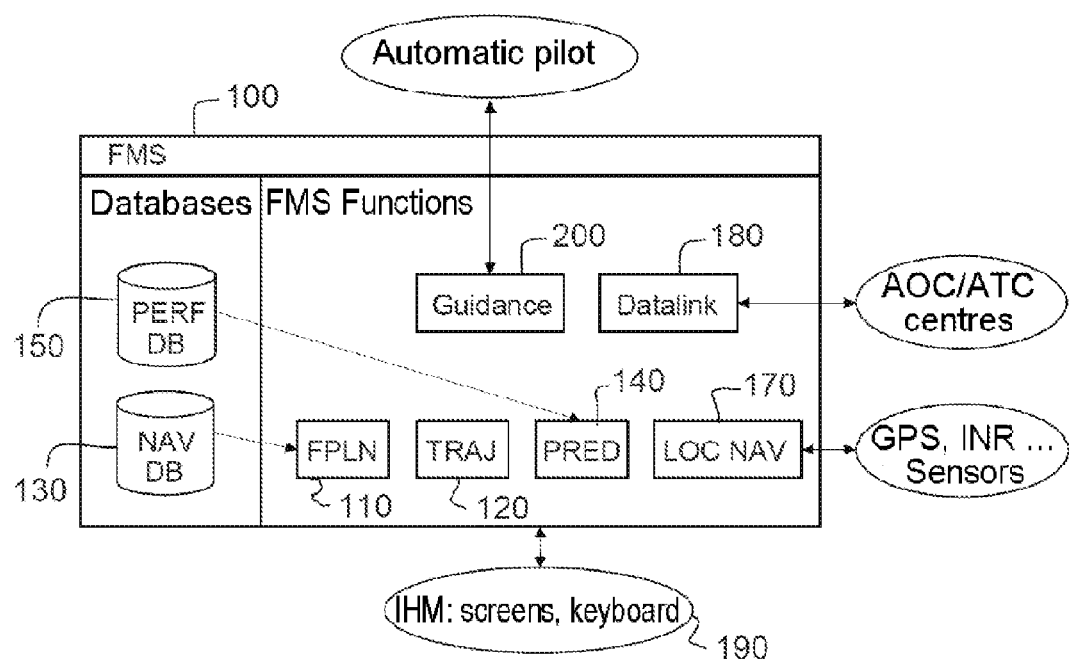
FIG. 13 shows the different components of a flight management system.

FIG. 13 shows the functional architecture of an onboard flight management system FMS. This well known standard architecture meets the ARINC 702A standard. One of the functions of the FMS is to locate the aircraft using its sensors 171 (inertial systems, GPS, radio beacons notably). This function is carried out by a location function LOC NAV 170. The system comprises the following functions and components:

a flight plan function FPLN 110, for acquiring the geographic elements constituting the skeleton of the route to follow (departure and arrival procedure, waypoints . . . );

a navigation database NAVDB 130, for constructing geographic routes and procedures from data included in the bases (points, beacons, interception or altitude legs . . . );

a performance data base, PRF DB 150, containing the aerodynamic and engine parameters of the aircraft;

a lateral trajectory function TRAJ, 120: for constructing a continuous trajectory from the points of the flight plan, complying with the aircraft performance and the confinement constraints (RNP);

a predictions function PRED, 140: for constructing an optimized vertical profile on the lateral trajectory;

a guidance function, GUID 200, for guiding the aircraft in the lateral and vertical planes on its 3D trajectory, whilst optimizing the speed;

a digital data link DATALINK, 180 for communicating with the control centres 181 and other aircraft.

From the flight plan defined by the pilot, characterized by the waypoints, the lateral trajectory is calculated as a function of the geometry between the waypoints corresponding to the legs, and/or as a function of the altitude and speed conditions. On this lateral trajectory, the FMS optimizes a vertical trajectory, in altitude and in speed, passing through possible altitude, speed and time constraints. All of the information entered or calculated by the FMS is grouped on display screens (MFD pages, NTD and PFD displays, HUD or others).

The HMI 190 (Human Machine Interface) part comprises the HMI component of the FMS which structures the data for sending to the display screens, called CDS (Cockpit Display System).

Several implementations of the method are possible in the FMS. The preliminary step 10 can be carried out during the design. A programming interface (API) between the system dedicated to the flight plan and the third party systems can be implemented for defining the services and the fields of use. It is for example integrated in the FMS, in an intermediate system (AID, standing for "domain interaction agent" for example) or in an IHS (standing for Man-System Interface).

The FMS, as a system dedicated to the flight plan, manages the simplified trajectory for the predictions and the complete trajectory for display and guidance. In other words, the calculations are carried out on the simplified trajectory but the screens display the complete trajectory for the crew.

The first step 1, the second step 2, the third step 3 and the fourth step 4 are carried out in the FMS. In particular:

the first step 1 is carried out by the core components of the FMS: FPLN, TRAJ and PRED notably;

the sub-steps 21, 22, 23, 24 of the second step 2 are carried out for example by the input and output interfaces;

the fifth sub-step 25 of the second step, carrying out the formatting of the sections and the calculation of the pivots, and the third step 3 are carried out by the core components of the FMS: FPLN, TRAJ and PRED notably;

the step 41 of configuration of the personalized display is carried out by the HMI components of the FMS;

the step 42 of configuration of the sensors is carried out by the LOCNAV component of the FMS;

the step 43 of configuration of the personalized guidance is carried out by the GUID components of the FMS;

the step 44 of formatting for sending is carried out by the DATALINK components of the FMS.

In a second possible implementation, the FMS manages the simplified trajectory for the predictions. The third party system, sender of the trajectory section to be inserted, manages the complete trajectory for display and guidance. The different steps and sub-steps are carried out by the same components as in the first implementation, except for:

the step 41 of configuration of the personalized display which is carried out by the sending third party system;

the step 42 of configuration of the sensors which is carried out by the sending third party system;

the step 43 of configuration of the personalized guidance, which is carried out by the sending third party system.

In a third possible implementation, the FMS manages the simplified trajectory for the predictions. The third party system, sender of the trajectory section to be inserted, manages the complete trajectory for the guidance and an integrated IHS manages the continuous overall display. The different steps and sub-steps are carried out by the same components as in the first implementation, except for:

the step 41 of configuration of the personalized display which is carried out by the integrated IHS;

the step 42 of configuration of the sensors which is carried out by the sending third party system;

the step 43 of configuration of the personalized guidance which is carried out by the sending third party system.

Other implementations are possible between the various systems in use.

It should be noted that the EFB, ANF, TP ground stations, or tablets notably also have a similar architecture notably composed of a display screen, a core processor, and a display manager in the core processor or between the core processor and the display screen. They can therefore receive these same types of implementation, notably for non-avionic applications.

In the avionic field, in addition to an FMS application, the invention can be applied to the real time systems on board an aircraft, notably in the following systems:

the Mission Management System (MMS) calculating mission trajectories (drop, refueling, low altitude terrain following, search and rescue (SAR), etc.);

the guidance system (FG for Flight Guidance or AP for Automatic Pilot) capable in so-called "higher" modes of carrying out calculations and following 3D geometric trajectories (SAR also);

the Taxiing management system (AOF for "Airport Onboard Function") calculating a ground trajectory (called "routing");

the meteorological surveillance system (WIMS for "Weather Information Management System") calculating geometric trajectories optimising the flight as a function of the weather (clouds, jets, turbulence, . . . );

the terrain surveillance system (TAWS for "Terrain Awareness and Warning System") calculating a trajectory guaranteeing safety with respect to the relief;

the traffic surveillance system (TCAS for "Traffic Collision Avoidance System") calculating a lateral or vertical trajectory for the avoidance of other aircraft;

the traffic monitoring system (Traffic Computer) making it possible to carry out lateral or vertical trajectories relative to a target aircraft (maneuvers known by the English acronyms ASAS or FIM);

the electronic flight bag (EFB for Electronic Flight Bag) making it possible for an air or ground crew, or via sophisticated algorithms, to propose modifications of trajectories in order to optimize the flight (surfing best winds, "tactile" trajectory modifications);

the ground communication system (CMU for Communication Management Unit) making it possible to exchange flight plans and trajectories with the ground;

an integrated IHS (interactive interface controlling several of the above systems) displaying various sections of various systems.

The invention can also be applied in fields other than that of avionics. It can notably be applied for naval or motor vehicle applications, for example for navigation systems. In motor vehicle applications, the trajectory sections are for example the alternative routes for avoiding for example a traffic jam, a temporary road works or a zone closed to motor vehicle traffic. Other applications are possible. In all of these other applications, the flight plan trajectory is replaced by another type of planned trajectory, which can for example be a motor vehicle navigation trajectory provided by a navigation aid system.

The invention notably has as advantages that it makes it possible to interact between a system dedicated to a flight plan with demonstrated navigability and safety capabilities, in a precise context, and systems wishing to integrate trajectory changes within the system. It makes it possible to calculate reliable predictions whatever the assembly of the succession of third party sections and pieces of flight plan may be.

The doubling mechanism between the displayed section and the simplified section, intended for the calculations, makes it possible to retain the memory and computing time resources of the system dedicated to the flight plan, provided that the simplified section makes it possible to remain inside an accepted envelope of trajectories. The system dedicated to the flight plan can thus carry out calculations without modification of the code or of the algorithms since the method according to the invention uses the parameters of the said envelopes. It is not therefore necessary to carry out a new certification.

Among the other advantages, the following can be mentioned, in a non-exhaustive manner:

the fact that the sections can be dynamic (several sections being sent successively): the filtering mechanism of the second sub-step 32 of the third step 3 makes it possible to recalculate a new section only if a significant change in the coordinates of the trajectory is detected (if for example a 5% simplified trajectory is used) the method does not carry out the calculations subsequent to this step, thus retaining the storage and computation performance (RAM/ROM/CPU) of the system dedicated to the flight plan;

the fact that the mechanism allows a third party system to carry out several tests on alternative sections, in order to gauge how optimal a section is in comparison with others.

the fact that, seen from the aircraft, the trajectory is unique, avoiding the problems of managing consistency: the clients "consume" only one trajectory.

The invention claimed is:

1. A method for the real time calculation of a trajectory followed by a moving object, the trajectory based on a planned trajectory, said real-time calculation being managed by a system, and the method being used for calculating at least one trajectory section sent by a third party system to the system, the method comprising:

a preliminary step for generating a knowledge base in a database, the knowledge base including calculation parameters and respective field of use of the calculation parameters for calculating the trajectory followed by the moving object, said respective field of use defining operational for operating the moving object, at least one envelope of parameters being defined within each said field of use, said at least one envelope corresponding to different operational constraints of the moving object;

a first step for initializing the planned trajectory according to the calculation parameters of the preliminary step, the calculation parameters of the planned trajectory being contained in the at least one envelope;

a second step for receiving at least one trajectory section sent by the third party system for inserting in the planned trajectory by replacing a part of the planned trajectory; and a third step for carrying out calculations of the trajectory based upon calculation parameters of the planned trajectory restricted to within the at least one envelope upon a segmentation of the planned trajectory resulting from said inserting of the at least one trajectory section, the third step being carried out after the received at least one trajectory is accepted by a system for real-time calculation of the trajectory of the moving object.

2. The method according to claim 1, wherein the at least one envelope includes a plurality of envelopes of different levels of operational constraints, the calculation parameters of the at least one trajectory section are contained in one of the plurality of envelopes.

3. The method according to claim 1, further comprising: integrating equations of movement dynamics of the moving body according to the calculation parameters of the planned trajectory restricted to within the at least one envelope.

4. The method according to claim 1, wherein a constraint level of an envelope containing calculation parameters of the at least one trajectory section is lower than a constraint level of another envelope containing the calculation parameters of the planned trajectory.

5. The method according to claim 1, wherein calculation results from the third step are multiplied by an inverse of a rate of contraction of the at least one trajectory section inserted in to the planned trajectory.

6. The method according to claim 1, wherein the third step includes calculating trajectories connecting parts of the planned trajectory and parts of the at least one trajectory section that is inserted into the planned trajectory, the at least one trajectory section being calculated to be inserted using the calculation parameters from the knowledge base corresponding to a type of a planned trajectory part being replaced.

7. The method according to claim 1, wherein said inserting includes receiving a plurality of geometries of the section being sent by the third party system successively for insertion into the planned trajectory, the method further comprising:
applying filtering to the plurality of geometries such that a new section geometry for the at least one trajectory section is inserted only if the new section geometry differs from a geometry of a current one of at least one trajectory section by a difference greater than a given threshold.

8. The method according to claim 7, wherein the given threshold is equal to a simplification rate of the current at least one trajectory section.

9. The method according to claim 1, wherein a plurality of geometries of the at least one trajectory section are sent successively by the third party section for insertion, and wherein the third step for carrying out the calculations includes carrying out real time calculations on respective geometries of the at least one trajectory section to select one of the at least one trajectory section to be inserted as a function of a result of the calculations.

10. The method according to claim 1, wherein the at least one trajectory section is displayed by display means as a real trajectory, the calculations being carried out on the at least one trajectory section when the calculation parameters of the planned trajectory are restricted to within the at least one envelope.

11. The method according to claim 1, wherein data of the part of the planned trajectory replaced by the at least one trajectory section are retrieved when the at least one trajectory section is deleted.

12. The method according to claim 1, wherein the calculations of the trajectory are managed in real-time by a flight management system, the planned trajectory being a flight plan trajectory followed by an aircraft.

13. The method according to claim 10, wherein the at least one trajectory section is a mission trajectory section.

14. The method according to claim 12, wherein the calculations include calculations of a prediction of a fuel consumption by the aircraft and of times of passage of the aircraft at given points.

15. The method according to claim 12, wherein points of transition (PIVOT IN, PIVOT OUT) between the at least one trajectory section and the planned trajectory is modifiable via an interaction on a display screen.

16. The method according to claim 13, further comprising: a step of configuration of sensors as a function of a mission corresponding to the mission trajectory section and as a function of parameters of calculations of the database established in the preliminary step.

17. The method according to claim 12, wherein, when the aircraft flies through an airspace corresponding to the at least one trajectory section, the method further comprises a step of configuration of guidance and piloting systems as a function of the calculation parameters of the at least one trajectory section.

18. The method according to claim 12, comprising a step for carrying out a formatting of trajectory information for sending to clients requesting an insertion of the at least one trajectory section.

19. An onboard trajectory management system configured to carry out real time trajectory calculations, said system comprising a processor configured to perform:
a preliminary step for generating a knowledge base in a database, the knowledge base including calculation parameters and respective field of use of the calculation parameters for calculating the trajectory followed by the moving object, said respective field of use defining operational for operating the moving object, at least one envelope of parameters being defined within each said field of use, said at least one envelope corresponding to different operational constraints of the moving object;
a first step for initializing the planned trajectory according to the calculation parameters of the preliminary step, the calculation parameters of the planned trajectory being contained in the at least one envelope;
a second step for receiving at least one trajectory section sent by a third party system for inserting in the planned trajectory by replacing a part of the planned trajectory; and
a third step for carrying out calculations of the trajectory based upon calculation parameters of the planned trajectory restricted to within the at least one envelope upon a segmentation of the planned trajectory resulting from said inserting of the at least one trajectory section, the third step being carried out after the received at least one trajectory is accepted by a system for real-time calculation of the trajectory of the moving object.

* * * * *